Dec. 3, 1940.   D. T. FLEMING   2,223,559
AGRICULTURAL MACHINE
Filed April 20, 1940   3 Sheets-Sheet 1

Inventor
DAVID T. FLEMING,

Dec. 3, 1940. D. T. FLEMING 2,223,559
AGRICULTURAL MACHINE
Filed April 20, 1940 3 Sheets-Sheet 2

Inventor
DAVID T. FLEMING,

Dec. 3, 1940.  D. T. FLEMING  2,223,559
AGRICULTURAL MACHINE
Filed April 20, 1940  3 Sheets-Sheet 3

Inventor
DAVID T. FLEMING,

Patented Dec. 3, 1940

2,223,559

UNITED STATES PATENT OFFICE 2,223,559

AGRICULTURAL MACHINE

David T. Fleming, Lahaina, Territory of Hawaii

Application April 20, 1940, Serial No. 330,766

16 Claims. (Cl. 111—89)

The invention relates to an agricultural machine and more particularly to a type thereof employed in transplanting or setting out young plants of any character.

An object of the invention is to remove or entirely eliminate the burdensome or onerous tasks incident to transplanting young plants in open fields.

Another object of the invention is to provide a means whereby holes of a predetermined depth are formed in the ground or soil and substantially evenly spaced in parallel rows so that young plants may be deposited therein in the process of transplanting.

A further object of the invention is to provide a transplanting device, mechanism or machine of flexible construction so that it may lend or adjust itself to irregularities in the ground traversed.

A feature of the invention is the provision of soil piercing means associated with a power unit and being of a character which derives its source of energy from the power unit to be moved along a predetermined path.

Another feature of the invention is to provide, in an agricultural machine, a transplanting device which may be selectively elevated or moved out of engagement with the subjacent soil so as to facilitate transportation of the device over roads or uncultivated ground without damage or injury to soil piercing portions thereof.

An added feature of the invention is to provide resilient or cushioning means in a transplanting device so that when the soil piercing portions thereof strike dense objects, such as stones, the driving mechanism may, without injury to the soil piercing portions, complete or continue its cycle of movement.

A still further feature of the invention is the provision of a device used in transplanting which is durable and rugged in construction, economical to maintain, positive and effective in operation, and of a simple skeletonized design.

The above enumerated objects and features as well as numerous others will become apparent upon referring to the accompanying drawings and a perusal of the succeeding description thereof.

Considering the drawings in general wherein an exemplified form of the invention is illustrated:

Figure 1:
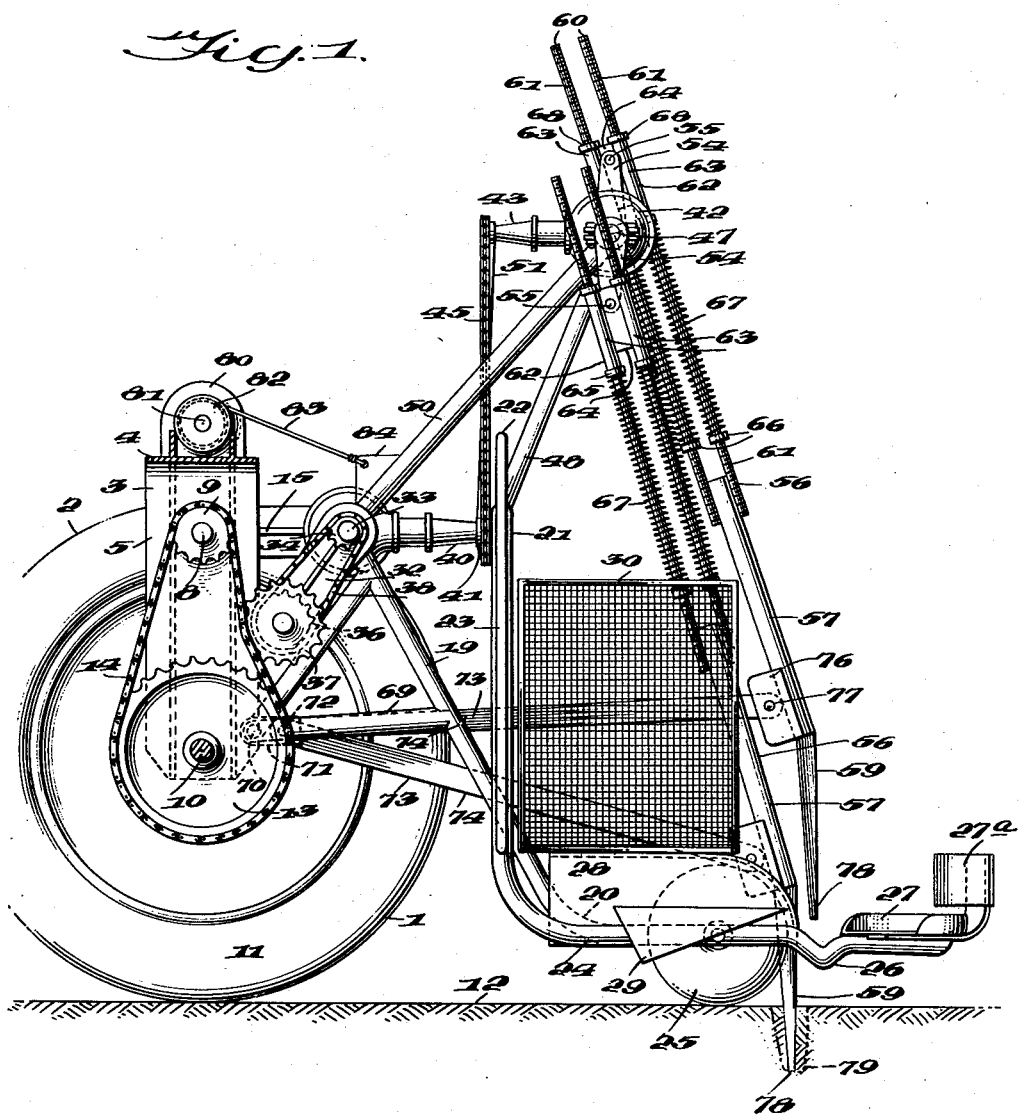
Figure 1 shows a side elevational view of a transplanting device characteristic of the present invention.

Referring now in detail to the drawings wherein like reference characters designate like parts, the numeral 1 is employed to indicate, in a general manner, a device adapted for use in transplanting or setting out young plants of any type.

Forming a means of motive power is a tractor 2 of substantially conventional form, only a rear or driving portion thereof being shown in the drawings. The tractor comprises a rear frame member 3 generally of inverted U-configuration in elevation and formed by a top or upper beam 4 and transversely spaced depending bifurcated legs 5. Carried by the upper beam is a casing 6 forming a receptacle for suitably meshed and proportioned gears (not shown) to form a differential which is actuated by a driving shaft 7, the latter of which has a torque movement imparted thereto by any desired or suitable power unit (not shown). Projecting laterally from the casing are oppositely directed main drive axles 8 journaled in suitable bearings (not shown) and each having, adjacent their free or outer extremities, inwardly of the rear frame legs, a drive or sprocket wheel 9 keyed or otherwise secured thereto. Suitably journaled, through the medium of a main axle 10, to each bifurcated leg in the proximity of its lower extremity is a drive, traction or pneumatic tired wheel 11 adapted to bear upon the surface of subjacent soil 12 to support and permit relatively free locomotion to the tractor. Fixed on each supporting axle 10, inwardly of the tractor from an associated tired wheel, is a driven or sprocket wheel 13 which is in vertical alignment with and operatively connected to the adjacent drive wheel 9 by means of a continuous, uninterrupted, main drive chain 14 so that upon forward movement of the tractor any torque motion imparted to the drive shaft will result in the sprocket wheels 9 and 13, main drive chain 14 and wheels 11 rotating in a counter-clockwise direction.

Extending rearwardly of the frame member 3 are transversely spaced gusset shaped supports or brackets 15 positioned adjacent and inwardly of the tractor from the traction wheels. The supports are secured to the rear frame by means of bolts, welds (not shown) or any other desired or convenient method. The brackets, forming the primary connection or rigid draft bars between the tractor and the transplanting device or machine 16, to be hereinafter described in detail, terminate at their extremities removed from the rear frame in suitable bearings 17. A lower or auxiliary housing 18 of conventional form extends transversely of the device at a vertical elevation, preferably adjacent the horizontal plane of the drive axles 8, to project through and be journaled in the bracket bearings 17 and thus retained thereby in a predetermined elevated position. Projecting downwardly, rearwardly and outwardly from the auxiliary housing, adjacent each bracket bearing, is a diagonal strut 19, preferably of tubular formation for its rigid characteristics, which, upon reaching a predetermined position above the surface of the soil 12, is bent or directed rearwardly away from the tractor in a substantially horizontal plane for an appreciable extent to form an inner sill 20.

A generally inverted U-shaped supplementary frame 21 is provided in the transplanting device to form an intermediate strength member, which will be hereinafter apparent, and also form a suitable spacing member for maintaining the associated parts in their respective positions. The supplementary frame preferably comprises an upper chord 22, laterally and horizontally positioned, and downwardly or vertically extending side arms 23. Forming continuations of or extending from the supplementary frame arms 23, adjacent their lower extremities, are substantially horizontal outer sills 24, also tubular cross section, each of which is suitably spaced a predetermined distance outwardly or transversely from an adjacent or associated inner sill.

Each pair of sills, formed by associated inner and outer sills, has, suitably and conventionally journaled thereto intermediate its longitudinal extremities, a pneumatic tired trailer or pony wheel 25 of a diameter considerably less than the diameter of the traction wheels 11 and in longitudinal alignment therewith. Since the auxiliary housing is pivotally or rotatably related to the brackets, the pony wheels form outer movable supports for the transplanting device and maintain it spaced above the soil. The inner and outer sills are convoluted, as at 26, in rear of the pony wheels to reinforce them against superimposed loads to which they will be subjected in service. The free extremities of the inner and outer sills form means to which seats 27 and back rests 27ª are secured, and by reason of this arrangement a person acting in the capacity of a planter will be supported in close proximity to the soil, slightly inwardly of each pony wheel, to be in a position to deposit young plants in the soil as the transplanting device traverses a predetermined path or course.

Extending between and secured to each pair of sills is an open-bottomed hood 28 which overlies the adjacent pony wheel to form a guard thereabout and eliminate the possibility of the above referred to planter having any portion of his body exposed to the rotating pony wheel.

Supports are provided to accommodate the legs of persons occupying the seats 27, and exemplary of this structure are inner and outer, upwardly opening, pan-shaped rests 29 which are secured to the wheel hoods and associated sills by any desired method. In addition to forming guards over the pony wheels, the hoods 28 also form supports for meshed or wire baskets 30, forming supply containers for the young plants to be transplanted. The baskets, preferably secured to the hoods by means of welds (not shown) have, adjacent their lower rear extremities, openings or windows 31 through which a planter may extract the plants from within the basket for the obvious purpose of depositing them in the soil. By this compact arrangement, therefore, planters may recline comfortably on the seats 27 with the supply of young plants easily within their reach.

Figure 2:
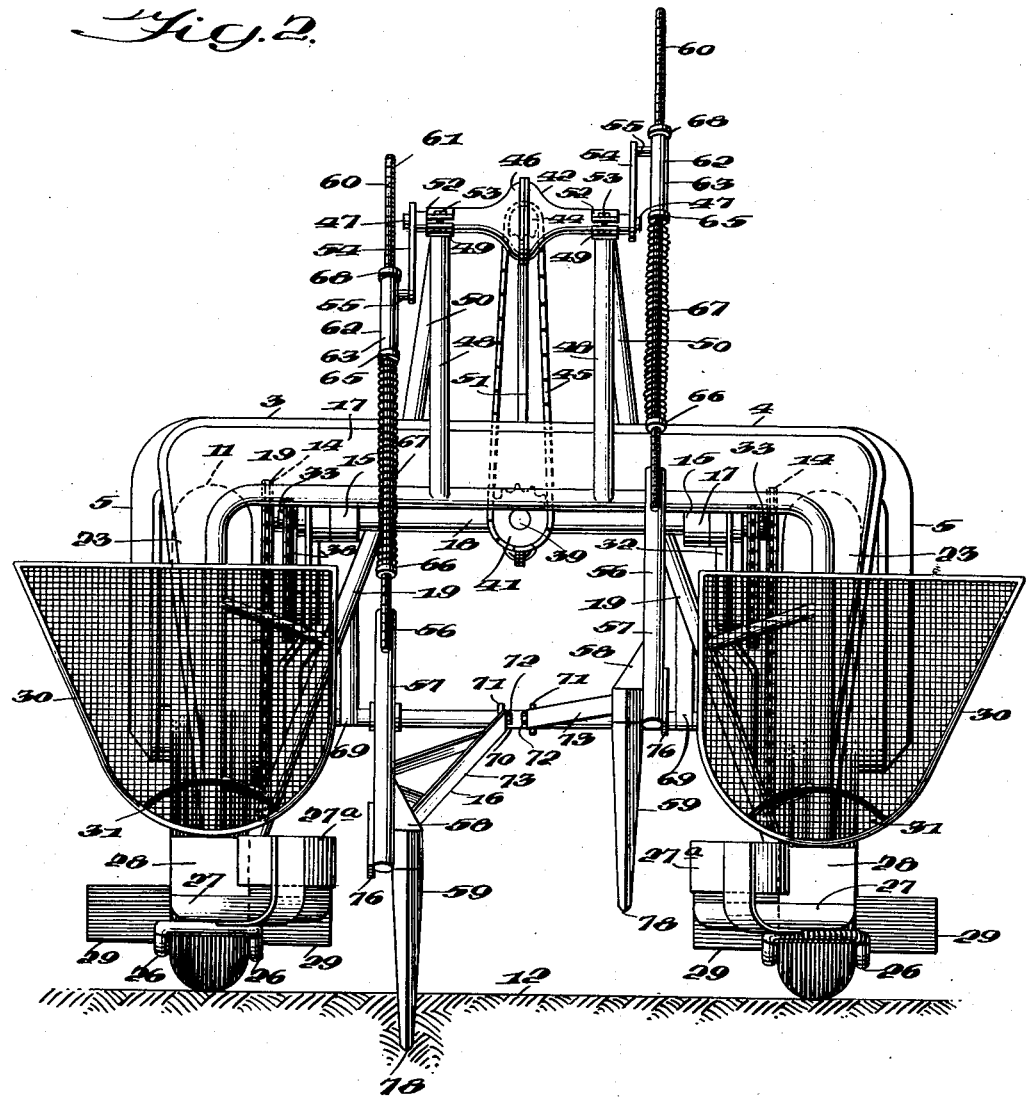
Figure 2 is an end elevational view of the transplanting device shown in Figure 1.
Figure 3:
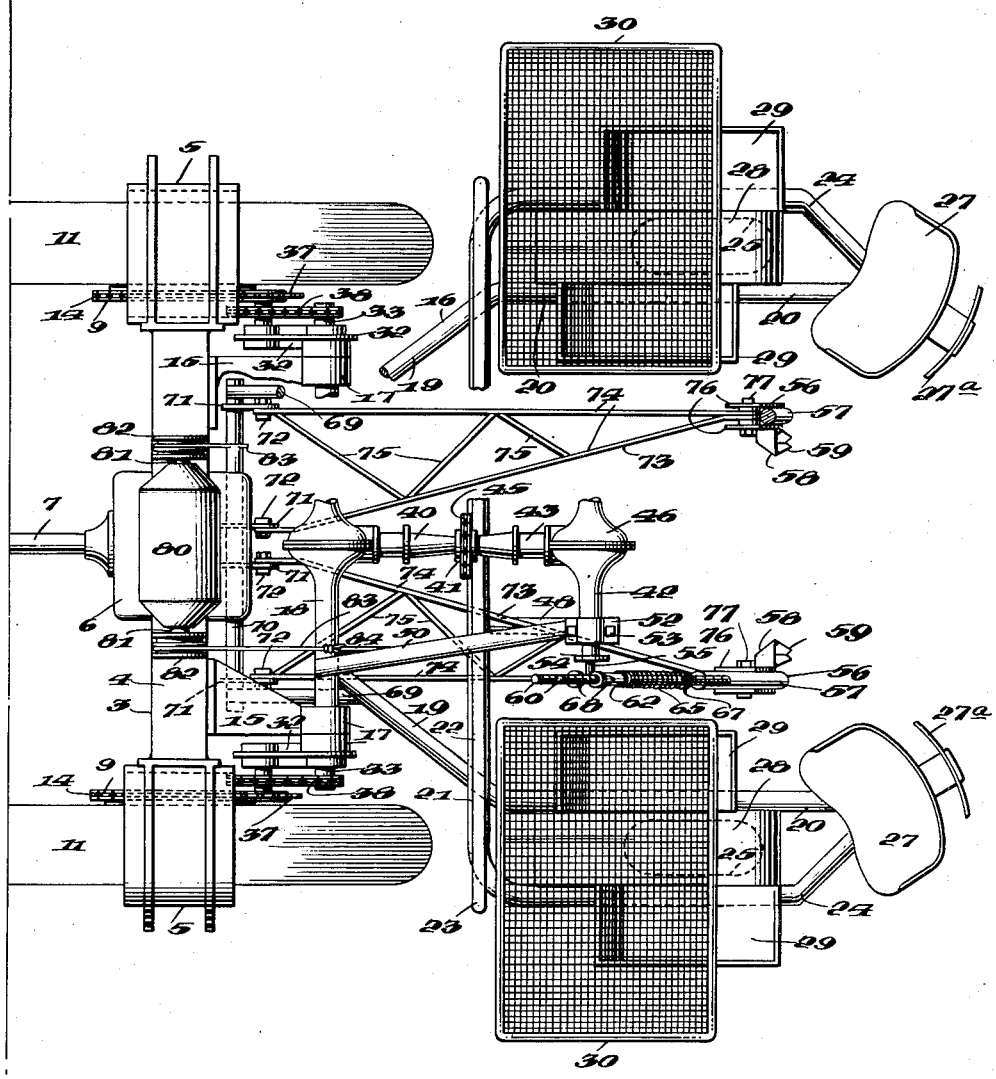
Figure 3 is a plan view of the transplanting device illustrated in Figures 1 and 2 with portions thereof removed to more clearly disclose the details of construction and association of parts.

The power or operating mechanism of the transplanting device is directly connected to the source of power for the tractor, and by reason of this arrangement both the tractor and the transplanting device derive their power or motivating energy from a common source, which presents an economical, positive and simple device. Characteristic of the power mechanism which may be employed are transversely spaced lever arms 32 rigidly secured to the extremities of the auxiliary housing 18 outwardly of the bracket bearings so as to be capable of a rotative movement therewith for the purpose to be hereinafter explained. The lever arms are desirably disposed forwardly and downwardly in a direction toward the tractor axle 10 and preferably terminate adjacent the plane of the associated main drive chains. Extremities of axles 33 extend through the auxiliary housing beyond the lever arms to terminate short of the drive wheels and have suitably keyed thereto auxiliary or relatively small sprocket wheels 34. Journaled in the free or lower extremity of the lever arms are oppositely directed stub shafts 35, each of which has a pair of intermediate, different diametered, inner and outer sprocket wheels 36 and 37, respectively, keyed thereto, so that any rotative forces transmitted to the outer sprocket wheels will be imparted to the inner sprocket wheels through the stub shafts 35. The outer or larger sprocket wheels 37 are each normally intermeshed through an adjacent or associated main drive chain, and in this manner the inner or smaller sprocket wheels and stub shafts are rotated in a clockwise direction upon a forward movement of the tractor. Interlaced with the inner sprocket wheel and the substantially overlying auxiliary sprocket wheels 34 are continuous, link-type, transplanting device drive chains 38 which drive the sprocket wheels 34 and their axles 33 in a clockwise direction when viewing Figure 1. It will be noted that the auxiliary sprocket wheels are relatively smaller than their connected inner sprocket wheels, and therefore the axles 33 are driven at a greater rotative speed than the stub shafts. The axles 33, as previously indicated, extend into the auxiliary housing adjacent its intermediate portion, where they are connected to a group of conventional type, intermeshed gears (not shown) to form a differential whereby the power from both axles 33 unites to drive a rearwardly extending shaft 39 in a counter-clockwise direction when viewing Figure 2. This arrangement has been provided so that when the tractor and its trailing transplanting device operate on a curve or arc and the traction wheel, inwardly of the arc toward its axis of tractor rotation, revolves at a different or lesser rate of speed than the complementary or outer traction wheel, the mechanism may still operate as intended because the difference in speeds of the auxiliary axles has been compensated for by the transmission.

The shaft 39 is encased in a stub intermediate auxiliary housing 40 and has, adjacent its free or rearmost extremity, a driven sprocket wheel 41, suitably keyed thereto and of a diameter slightly greater than the auxiliary sprockets 34 so that the effective speed of subsequent mechanism, to be hereinafter described, may be further stepped up or increased. Positioned in a plane above the auxiliary housing is a supplementary upper housing 42 relatively shorter than the auxiliary housing. The upper housing extends transversely of the device substantially parallel with the auxiliary housing and has, extending forwardly from an intermediate portion thereof, a horizontally disposed casing 43, preferably terminating short of the extended vertical plane of the sprocket wheel 41. Rotatably mounted within the casing 43 is an axle (not shown) which has a supplementary sprocket wheel 44 fixedly associated therewith in the close proximity to the adjacent end of the casing. The sprocket wheels 41 and 44 are in substantially vertical alignment and accordingly are disposed to receive and have intermeshed therewith a connecting, continuous, link chain 45 so that power or torque forces may be transmitted to the casing axle and rotate it in a counter-clockwise direction. Within the enlarged intermediate portion 46 of the upper housing is a set of gears (not shown) to form a conventional differential actuated by the casing axle and, in turn, rotating in a clockwise direction, oppositely disposed axles 47 extending through and beyond the transverse limits of the upper housing. The upper housing is supported in elevated position from the supplementary frame and auxiliary housing so as to present a substantially rigid structure, and as exemplary of the above, there are provided transversely spaced, substantially vertical, legs 48 which are preferably tubular in cross section and the lower extremities of which are secured by welding or any other method to the supplementary frame. The upper extremities of the legs are secured to upwardly facing cup-shaped cradles 49 upon which the upper housing bears. In substantially longitudinal alignment with the legs 48 are inclined braces 50 which reinforce the upper housing against hinging actions about the base of the supporting legs 48. The inclined braces 50, also of tubular formation, extend between the auxiliary housing and cradles to be secured thereto in any approved manner. Since the intermediate housing 40 and the casing 43 form, in effect, overhanging arms, a standard or column 51 extends therebetween and is secured thereto in the proximity of the sprocket wheels 41 and 44 to rigidly connect the intermediate housing and casing and, therefore, reinforce the auxiliary and upper housings against turning moments to which they may be subjected during service. Associated with each cradle is a cap 52 bearing upon the upper housing to maintain it in a predetermined position. Bolts 53 or any other desired means are employed to draw the cradles and their associated caps together and grip the upper housing therebetween.

Fixedly secured to and adjacent the outer free extremities of the axles 47 are oppositely directed crank arms 54 adapted to move in a clockwise direction with their corresponding axles. The crank arms have crank pins 55 directed transversely of the device and away from one another to be intimately associated with substantially vertically movable planting or soil piercing blades, indicated generally by the reference character 56. Each planting blade preferably comprises an intermediate shank or nipple 57, to a lowermost extremity of which is, through a gusset-shaped plate 58, rigidly secured a spade 59 of chevron- or U-shape in horizontal cross section, so that as the spade moves horizontally relatively to the ground while its lower extremity is imbedded in the ground it forms, in effect, a plow to spread the soil and present a suitable hole therein for the deposit of a young plant. The particular formation of the spade, which is maintained throughout its entire range of movement substantially perpendicular to the subjacent ground, also presents a suitable guideway into which a planter may place a young plant preparatory to lowering it into the hole to be formed by the spade, and by reason of this arrangement the delicate roots of the plant will not be broken off during the process of transplanting.

To the upper extremity of each intermediate shank is securely fastened a pair of parallel extension bars 60, preferably of circular configuration in cross section so that they may be exteriorly threaded, as at 60. Movably associated with each pair of planting blade bars, adjacent their upper extremities, is a sleeve 62 formed by a pair of cylindrical or tubular members 63 joined by a connecting intermediate web 64. The tubular members are of an internal diameter sufficient to neatly accommodate and slide with respect to associated bars, while the connecting web of each sleeve is apertured for the reception of the associated crank pin which extends therethrough. Each sleeve tubular member desirably terminates at its lower extremity in a shoulder 65. Spaced along each planting blade bar is an abutment or stop 66, interiorly threaded so as to be adjustable longitudinally of the bar. Cushioning means is provided in the planting blades so that if the spades strike an obstruction in the soil, such as a stone or any like formation, the operating mechanism may continue to perform without injury to the spades. Illustrative of the above-mentioned means is a coil or helical spring 67 positioned about each planting blade bar and reacting, longitudinally of the planting blade, against a related sleeve shoulder 65 and stop 66. The compressive value of the springs is determined by the position of the stops 66 along the bar and, as will be understood, forces transmitted to the sleeves through the crank arms will be carried to the stops 66 by the springs, and thence to the spades, by the shanks 57. Accordingly, the stops are positioned on the bars so that the compressive forces in each pair of springs are greater than the spade resisting force of the soil, and in this manner the spade will be driven into the ground to its predetermined depth. Since the sleeves are slidably mounted on the bars, means must be provided to lift the planting blades out of the soil, and to accomplish this result each bar has a collar 68, which may be in the form of a commercial nut, rotatively and selectively adjustable so that it may form an abutment or bearing for the related sleeve tubular member. The location of the collars along the bars determines the depth in which the spades will penetrate the soil so that if it is desired to drive the spade at a greater depth than that illustrated in Figures 1 and 2, the collars 68 of the planting blades must be moved toward the adjacent extremities of the related bars, which will necessitate moving the stops 66 along the bars a corresponding distance to return the springs to their predetermined compressive value. From the foregoing it will be noted that if a spade, upon being driven into the ground, strikes an object of greater hardness than the soil, such as a stone, the continued movement of the spade will cease, while the driving forces will be absorbed by the associated springs, since the sleeve will merely move downwardly relatively to the rods to further compress the springs.

Extending rearwardly from each diagonal strut is a substantially V-shaped brace 69, terminating adjacent the main axle 10 and carrying a transverse radius support 70 which rigidly joins the braces 69 adjacent their apices. The radius support has, intermediate its juncture with the braces 69, anchor plates 71, preferably four in number, extending from one side thereof and intermittently spaced along the radius support. Pivotally connected to the anchor plates by means of pins or bolts 72 are normally horizontal radius rods, spacing beams or guide levers 73 formed by pairs of bar plates 74 inclined with respect to one another, with each pair merging adjacent a corresponding shank and reinforced against transverse thrusts by means of inner lattice plates 75. Each shank has, adjacent its lower extremity, transversely spaced jaws 76 between which is a merged extremity of a spacing beam, to be pivotally secured thereto by means of pins or bolts 77. By reason of this arrangement and relationship of parts the radius rods not only maintain the lower extremities of the planting blade in a relatively fixed position but also force the lower extremities of the blades to move in an arc about the pins 72. Upon rotation of the crank arms the planting blades will oscillate about the pins 77 as well as move in a substantially vertical direction, to result in the points 78 of the spades describing a path through the soil, not wholly unlike the dotted and diagrammatic line indicated by the reference character 79. This path will be flattened out or elongated somewhat because of the forward movement of the tractor and transplanting device, but it appears sufficient to state that the point 78 moves in a counter-clockwise direction as the tractor progresses, and this movement reduces the length of the hole in the soil.

Consideration has also been given to the protection of the spades while transporting or drawing the transplanting device along a hard surfaced road, and occasion often arises, in moving the device from one cultivated field to another, that it must cross improved roads. During such travels if the spades are permitted to engage the ground they will be readily rendered useless. Accordingly, means has been provided to elevate the entire transplanting device clear of the ground, and to accomplish this end a clutch and hoisting gear arrangement (not shown) within a drum 80 has been mounted on and centrally of the tractor rear frame. The arrangement is selectively connected to the gears in the tractor casing 6 so that they may be energized at the will of an operator. Projecting laterally from the drum are hoist axles 81 upon which are keyed cylinders or winding spools 82 adapted to rotate with the hoist axles. Threaded around the winding spools are flexible ropes or cables 83 which extend and are secured to anchor plates 84 the latter of which upstand from the braces 50. When the hoisting gears in the drum are operatively connected to the gears in the tractor casing 6 the cylinders are made to rotate in a counter-clockwise direction, viewing the structure of Figure 1, shortening the effective free length of the cables to pivot the transplanting device about the auxiliary housing 18 and thereby raise the pony wheels and spades out of contacting range of the ground. It will be noted that when the transplanting device is pivoted out of engagement with the ground the outer sprocket wheels 37, being moved in a counter-clockwise direction, are carried out of contact with the main drive chains 14, and accordingly the motive power for the planting blades will be disrupted or interrupted, which will eliminate wear of the parts thereof while the device is being transported from one location to another. Another distinct advantage in this particular arrangement is that if it is desired to use the tractor for purposes other than transplanting, a disconnection of the transplanting device from the tractor necessitates merely disconnecting the brackets 15 from the frame and untying the cable at its juncture with the anchor plates.

From the preceding it will be noted that various changes may be made to the exemplary form of the invention shown in the drawings and the description thereof without departing from within the spirit and scope of the appended claims.

I claim:

1. In an agricultural machine, in combination, a tractor, a transplanting device movably associated with said tractor, said transplanting device comprising an auxiliary housing, struts depending from said auxiliary housing terminating in inner sills, a frame spaced from said auxiliary housing terminating in outer sills, wheels journaled to and between said inner and outer sills and adapted to bear upon soil, hoods overlying said wheels and secured to said sills, plant containers supported by said hoods, and substantially vertically movable spades operatively connected to movable means of said tractor for driving them into the soil.

2. In an agricultural machine, in combination, a tractor, driving means for said tractor, a transplanting device comprising an auxiliary housing pivotally connected to said tractor, a sprocket wheel associated with each end of said auxiliary housing, lever arms carried by said auxiliary housing, means rotatably associated with said lever arms and connected to said sprocket wheels and driving means, an upper housing having transversely spaced crank arms, means connecting said sprocket wheels and said crank arms for rotating the latter, and planting blades pivotally connected to said crank arms for moving the former in a substantially vertical soil piercing direction.

3. In an agricultural machine, in combination, a tractor, driving means for said tractor, a transplanting device comprising an auxiliary housing pivotally connected to said tractor, a sprocket wheel associated with each end of said auxiliary housing, lever arms carried by said auxiliary housing, means rotatably associated with said lever arms and connected to said sprocket wheels and driving means, an upper housing having transversely spaced crank arms, means connecting said sprocket wheels and said crank arms for rotating the latter, and planting blades pivotally connected to said crank arms for moving the former in a substantially vertical soil piercing direction, said planting blades having shock resisting means associated therewith so that said crank arms will continue to rotate upon an arrest of the planting blades.

4. In an agricultural machine, in combination, a tractor, means movable in response to movement of said tractor, a transplanting device movably associated with said tractor and comprising an auxiliary housing, a sprocket wheel associated with each end of said auxiliary housing, means operatively connecting said sprocket wheels and tractor movable means, an upper housing supported by said auxiliary housing, transversely spaced crank arms carried by said upper housing, means operatively connecting said sprocket wheels and crank arms, vertically movable planting blades having their upper extremities pivotally attached to said crank arms, guide rods pivotally secured to said planting blades adjacent their lower extremities, and spring means in said planting blades to permit a continued movement of said crank arms while movement of said planting blades in a downward direction is arrested.

5. In an agricultural machine, in combination, a tractor, driving means for said tractor, a transplanting device comprising an auxiliary housing pivotally connected to said tractor, a sprocket wheel associated with each end of said auxiliary housing, means operatively connecting said sprocket wheels and driving means, an upper housing supported by said auxiliary housing, transversely spaced crank arms carried by said upper housing, means operatively connecting said sprocket wheels and crank arms, vertically movable planting blades having their upper extremities pivotally attached to said crank arms, guide rods pivotally secured to said planting blades adjacent their lower extremities, and means connecting said tractor and transplanting device adapted to be selectively connected to said tractor driving means for rotating said transplanting device about its auxiliary housing.

6. In an agricultural machine, in combination, a tractor, driving means for said tractor, a transplanting device comprising an auxiliary housing pivotally connected to said tractor, an upper housing supported by said auxiliary housing, oppositely directed crank arms carried by said upper housing, means operatively connecting said tractor drive means and crank arms for rotating the latter, planting blades having sleeves pivotally connected to said crank arms, spades forming the lower extremities of said planting blades adapted to be moved substantially vertically in a soil piercing action, and spring means between said sleeves and spades to cushion abnormal shocks to which the spades may be subjected during service.

7. In an agricultural machine, in combination, a self-propelled wheeled vehicle, actuating means responsive to movement of said vehicle, a transplanting device associated with said vehicle and comprising an auxiliary housing, struts depending from said auxiliary housing, a frame spaced from said auxiliary housing, trailer wheels connected to said struts and frame, an upper housing supported by said auxiliary housing and frame, arms rotatably associated with said upper housing, means operatively connecting said arms and said actuating means, and planting blades connected to said arms and adapted to be moved in a substantially vertical direction.

8. In an agricultural machine, in combination, a tractor, driving means for said tractor, a transplanting device comprising an auxiliary housing pivotally connected to said tractor, an upper housing supported by said auxiliary housing, crank arms rotatably associated with said upper housing, means operatively connecting said crank arms and said tractor driving means, diagonal struts depending from said auxiliary housing, pony wheels connected to said diagonal struts, substantially vertically movable planting blades having their upper extremities pivotally connected to said crank arms, and guide beams pivotally connected to said diagonal struts and lower extremities of said planting blades.

9. In an agricultural machine, in combination, a tractor, driving means for said tractor, a transplanting device comprising an auxiliary housing pivotally secured to said tractor, an upper housing supported by said auxiliary housing, crank arms rotatably associated with said upper housing, power means operatively connecting said tractor driving means and crank arms, sleeves pivotally secured to said crank arms, rods slidably associated with said sleeves, soil piercing spades connected to said rods, and spring means reacting against said sleeves and rods, the compressive value of said spring means being greater than the spade resisting force of said soil.

10. In an agricultural machine, in combination, a wheeled vehicle, means movable in response to movement of said vehicle, a transplanting device movably associated with said vehicle and comprising an auxiliary housing, an upper housing supported by said auxiliary housing, oppositely directed, transversely spaced, crank arms rotatably associated with said upper housing, actuating means operatively connecting said vehicle movable means and crank arms, sleeves pivotally secured to said crank arms, rods slidably associated with said sleeves, soil piercing spades connected to said rods, springs reacting against said sleeves and rods, and means pivotally associated with said rods for guiding said soil piercing spades.

11. In an agricultural machine, in combination, a tractor, driving means for said tractor, a transplanting device comprising an auxiliary housing pivotally connected to said tractor, struts depending from said auxiliary housing, soil engaging trailer wheels rotatably associated with said struts, an upper housing supported by said auxiliary housing, rotatable means carried by said upper housing, actuating means operatively connecting said tractor driving means and rotatable means, and transplanting blades adapted to be moved substantially vertically by said rotatable means, said transplanting blades having soil piercing spades at their lower extremities chevron-shaped in cross section so as to spread the soil preparatory to depositing plants therein.

12. In an agricultural machine, in combination, a wheeled vehicle, movable means in said vehicle, a transplanting device movably associated with said vehicle and comprising an auxiliary housing, an upper housing supported by said auxiliary housing, oppositely directed crank arms carried by said upper housing, actuating means operatively connecting said vehicle movable means and said crank arms, sleeves pivotally connected to said crank arms, rods slidably associated with said sleeves, collars adjustably associated with said rods and forming abutments for said sleeves to limit movement thereof in one direction, stops movably associated with said rods spaced a predetermined distance from said sleeves, spring means interposed between and reacting against said stops and sleeves, said springs having a compressive value determined by the location of said stops on said rods, and soil piercing means connected to said rods.

13. A transplanting device comprising a plurality of soil piercing members, a sleeve slidable on each of said members, a crank arm pivotally connected to each sleeve, means associated with each soil piercing member, and a spring interposed between each sleeve and means, said means being movable with respect to said members to vary the compressive value of said springs.

14. A transplanting device comprising a soil piercing member, a rod connected to said soil piercing member, a slidable sleeve on said rod, a crank arm connected to and adapted to move said sleeve, means associated with said rod, a spring interposed between and reacting against said sleeve and means, said means being movable with respect to said member to vary the compressive value of said spring, and adjustable means associated with said rod and forming an abutment for said sleeve; the position of said adjustable means being determinative of the depth to which the soil piercing member penetrates the soil.

15. A transplanting device comprising a soil piercing member, a sleeve slidable on said member, a crank arm pivotally connected to and adapted to move said sleeve, means associated with said member, a spring interposed between said sleeve and means, said means being movable with respect to said member to vary the compressive value of said springs, and a radius rod connected to said soil piercing member for guiding it in a substantially vertical direction.

16. In an agricultural machine, in combination, a self-propelled wheeled vehicle, movable means in said vehicle, a transplanting device pivotally connected to said vehicle and having soil piercing members, and mechanism in said transplanting device for actuating said soil piercing members and including means normally in operative engagement with and driven by said vehicle movable means, said transplanting device means being movable out of engagement with said vehicle movable means upon an upward pivotal movement of said transplanting device about its connection to said vehicle to thereby render said transplanting device mechanism inoperative.

DAVID T. FLEMING.